(12) United States Patent
Filippovitch

(10) Patent No.: US 10,619,784 B2
(45) Date of Patent: Apr. 14, 2020

(54) APPARATUS FOR LAUNCHING AND RECEIVING A PIG INTO OR FROM A PIPELINE

(71) Applicant: Rosen Swiss AG, Stans (CH)

(72) Inventor: Sergei Filippovitch, Richmond Hill (CA)

(73) Assignee: Rosen Swiss AG, Stans (CH)

( * ) Notice: Subject to any disclaimer, the term of this patent is extended or adjusted under 35 U.S.C. 154(b) by 82 days.

(21) Appl. No.: 15/748,779

(22) PCT Filed: Jul. 14, 2016

(86) PCT No.: PCT/EP2016/001227
§ 371 (c)(1),
(2) Date: Jan. 30, 2018

(87) PCT Pub. No.: WO2017/020991
PCT Pub. Date: Feb. 9, 2017

(65) Prior Publication Data
US 2019/0024837 A1    Jan. 24, 2019

(30) Foreign Application Priority Data
Jul. 31, 2015 (DE) .................. 10 2015 112 658

(51) Int. Cl.
*F16L 55/46* (2006.01)
*F16L 101/12* (2006.01)
*F16L 101/30* (2006.01)

(52) U.S. Cl.
CPC .......... *F16L 55/46* (2013.01); *F16L 2101/12* (2013.01); *F16L 2101/30* (2013.01)

(58) Field of Classification Search
CPC .... F16L 55/46; F16L 2101/12; F16L 2101/30
(Continued)

(56) References Cited

U.S. PATENT DOCUMENTS 3,911,724 A * 10/1975 Grove ................ F16L 55/46
73/1.17
8,616,074 B2 * 12/2013 Kearns ............... F16L 55/46
137/559

(Continued)

FOREIGN PATENT DOCUMENTS

DE     4334872 A1    4/1995
EP     0426871 A1    5/1991
(Continued)

OTHER PUBLICATIONS

International Search Report dated Oct. 17, 2016 (PCT/EP2016/001227).

*Primary Examiner* — Laura C Guidotti
(74) *Attorney, Agent, or Firm* — Alix, Yale & Ristas, LLP

(57) ABSTRACT

Apparatus for launching and receiving a pig into or from a pipeline, comprising an extension having an internal space with an access point, into the internal space, located at the end, and an exit point in the direction of the pipeline or entering into the latter, in which the internal space can be fluidically connected to the pipeline, in which in the internal space there is arranged a guiding element, for receiving the pig, that can be moved in the longitudinal direction of the extension and in the internal space, and arrangement for launching or receiving a pig in a pipeline.

14 Claims, 5 Drawing Sheets

(58) Field of Classification Search
USPC .................................................. 15/104.062
See application file for complete search history.

(56) References Cited

U.S. PATENT DOCUMENTS

| | | |
|---|---|---|
| 2008/0072963 A1 | 3/2008 | Strohmeier et al. |
| 2011/0259594 A1 | 10/2011 | Rosen |
| 2012/0090414 A1 | 4/2012 | Kearns et al. |

FOREIGN PATENT DOCUMENTS

| | | | | | |
|---|---|---|---|---|---|
| EP | 2422890 | A1 | | 2/2012 | |
| GB | 2196715 | A | | 5/1988 | |
| GB | 2247505 | A | | 3/1992 | |
| GB | 2444067 | A | * | 5/2008 | .............. F16L 55/46 |
| WO | 9950586 | A1 | | 10/1999 | |

* cited by examiner

APPARATUS FOR LAUNCHING AND RECEIVING A PIG INTO OR FROM A PIPELINE

BACKGROUND

The present invention relates to a device for loading and unloading a pig into or out of a pipeline, comprising an attachment piece having an interior space, with an end-side access point into the interior space and an outlet leading in the direction of the pipeline or into the latter, wherein the interior space is able to be brought into fluid communication with the pipeline, in particular an oil or gas pipeline.

Prior art of the generic type for loading and unloading a pig is known from U.S. Pat. No. 8,616,074 B2. In said document, a device that is configured in the form of a Y piece has in the figures an attachment piece, which is connectable or connected to the Y piece on one side via valves and to the further pipeline on the other side via a kicker line. A guide element for receiving a pig can be moved via a drive means in the form of a threaded rod into the region through which primary flow takes place, and can be moved into or out of the latter in order to discharge or receive the pig, respectively. In this operating state, the interior space of the attachment piece is in fluid communication with the pipeline on account of being flowed through by the medium flowing in via the kicker line. Thus, on account of the drive means, a further access point into the pipeline or into the Y piece has to be sealed off.

In this device and in other prior art devices of similar construction, an additional opening in the pipeline is also necessary for the kicker line. Via said additional opening, the rear of the pig is subjected to pressure by the medium located in the pipeline in order to travel into the pipeline.

In addition to the risk associated with the opening in a second region of the pipeline, the device according to U.S. Pat. No. 8,616,074 B2 is also of relatively large construction, and this may be problematic in particular in pipeline systems present in industrial plants. At the same time, insertion into and removal from the line can be problematic, if the guide element and inner wall of the Y piece do not allow reliable sealing with respect to the pig or to the discs and cups thereof. As a result of excessive pressure drops on account of medium flowing past, the movement of the pig cannot be ensured one hundred percent.

SUMMARY

It is an object of the present disclosure to simplify the introduction and withdrawal of a pig into or out of a pipeline for inspection or cleaning purposes, to allow the device installed permanently in the device to be of smaller construction and in particular to be able to design the device to be more process reliable.

The object is achieved by a device according to Claim 1 and by an arrangement according to Claim 12. Advantageous configurations of the invention can be gathered from the dependent claims that refer back thereto and from the following description.

According to the disclosure, provision is made to develop a device of the generic type according to the preamble of Claim 1 such that the attachment piece has a guide element for receiving the pig, said guide element being movable in the longitudinal direction of the attachment piece and in the interior space. This guide element can replace the prior art guide element integrated in the Y piece. The technology installed directly in the pipeline is thus simpler. The number of necessary seals is reduced, since no handling elements for any actuating means present have to be guided out of the Y piece. The impermeability of the Y piece is improved, and this can result in extended inspection intervals. The expensive and technologically more complicated device as a result of the guide element, said device being formed fundamentally by the attachment piece, is removable from the pipeline and can be stored in a safe manner.

The guide element is transferable via any actuating means present into a use position in the pipeline by way of a mouthpiece, and this can be enabled for example on account of a sufficiently long configuration of the guide element or by correspondingly long actuating means.

In particular, the guide element is in the form of a cartridge which forms a circumferentially closed hollow body when viewed in the longitudinal direction of the guide element. When viewed in the direction of a longitudinal axis of any pig or of the hollow body, the hollow body encloses the pig in the circumferential direction. It is then easier to seal the pig off with respect to the cartridge than to seal it off with respect to a carriage and the device wall, which do not necessarily have surfaces that merge into one another in a flush manner or together have a circular cross-sectional shape. Although the cartridge can also have openings in the hollow-body wall or other open structures or apertures in sections along the length of said cartridge, these should be arranged in regions which are harmless for driving the pig out of the cartridge and do not allow any bypasses.

At the same time, the problem of insufficient sealing on account of the inner wall geometry in the transition region of the Y or S piece into the region through which the fluid medium primarily flows is reduced. While it is being inserted into the pipeline, the pig is thus in precisely defined states with regard to sealing contact. The transition into the pipeline thus occurs in a more process reliable manner. In addition, the pig can be moved via the guide element out of the use position in the attachment piece and into a position close to that region of the pipeline through which flow mainly takes place in regular operation, wherein the pig is not moved in the cartridge.

Only at the time at which the medium flows against the pig from behind and the driving force resulting from the pressure exceeds the static friction in the advancing direction does the pig move with respect to the cartridge.

Preferably, the cartridge is thus provided with a central receiving region in which the pig can be arranged close to an inner wall of the hollow body. This receiving region, which is preferably provided with a circular cross section, has, via the inner wall of the hollow body, a shape which allows good sealing contact of any sealing discs of the pig in particular in that it corresponds to the free inside diameter of the pipeline to be inspected or cleaned.

Preferably, a flow duct that extends in the longitudinal direction of the guide element and at least one further flow duct that extends counter to this direction are formed in the interior space, said flow ducts being connected together via at least one deflection region and being able to pass into fluid communication with a medium located in the pipeline by a closure part being transferred into a use position, wherein in particular the cartridge forms the flow ducts. With such a configuration, it is possible to dispense with what is known as a kicker line. The flow of the fluid present in the pipeline is guided by the device itself, specifically both in a direction by way of which a pig present in the cartridge can be driven when it is loaded from the device, and in a direction when it is unloaded in the opposite direction from the pipeline into the device. The two flow ducts are connected together via a deflection region located preferably in the region of the rear end of the device. Thus, a pig to be introduced into the device and in particular into the attachment piece can push the medium located in front of it in the direction of the access point, wherein the medium is deflected in the deflection region, however, and then flows in the opposite direction again, preferably outside an inner wall of the cartridge and between the cartridge and the outer wall of the device. These two ducts are able to be linked to the pipeline interior located downstream or upstream.

The flow passing through the attachment piece can be influenced by the dimensioning of the channels. In particular, more favourable flow conditions can be created by enlarging the inside diameter of the attachment piece while the size of the cartridge remains the same, for example for loading the pig into the pipeline.

Since the flow ducts are accommodated in the device itself, only the device needs to be sealed off from the surroundings. This increases operational reliability, and a further, fluid-conducting connection to the pipeline and/or the pipeline section, known as the kicker line, can be dispensed with.

Preferably, the device has a main flow duct, which is formed in particular by the receiving region for the pig, and at least one, preferably a number of secondary ducts, in which the medium can flow in the opposite directions. The secondary ducts can accordingly be arranged around the main duct.

As a result of a closure part being transferred into a use position, wherein the movement of the closure part preferably accompanies a movement of the cartridge, the main flow in the pipeline is deflected in the direction of the flow ducts in the device according to the invention, and said flow ducts pass into fluid communication with the medium located in the pipeline. Thus, in the use position, the closure part is in a position interrupting the flow of medium in the pipeline. As a result of the deflection region, deflection takes place between the flow ducts and the flow reverses within the device.

Thus, it is possible to dispense with further devices for interrupting the flow, such as separate valves provided in the prior art, and the impermeability of the pipeline including the device according to the invention is not at further risk.

Preferably, the closure part is formed by the cartridge itself, in particular the mouthpiece thereof, or by a valve part fastened to the cartridge. Thus, the flow is interrupted by the movement of the cartridge itself into its use position. The cartridge can in this case be configured such that it has sealing properties in the regions in which it comes into abutment with pipeline parts in the actual through-passage region for the medium flowing in the pipeline. In this case, the cartridge can be provided at its end with sealing means, in order to come into better sealing contact and to interrupt the flow in the pipeline. No further switching means are required. It is also possible to dispense with further valve arrangements. As a result of the cartridge moving into a use position for the pig, i.e. a position from which the pig can be loaded into or unloaded out of the pipeline, the flow is interrupted or diverted into the flow ducts formed by the device and in particular by the cartridge.

The two flow ducts can be located alongside one another transversely to the longitudinal axis of the attachment piece, such that, in addition to a first flow duct formed in particular as a main flow duct, a number of secondary ducts are arranged around the main flow duct. Thus, not only can a central passage for the inspection pig be realized, but also uniform loading and reduced wear in individual regions are realized as a result of the distribution of the pressure around the main flow duct. The device is able to be sealed better overall and is also designed in a more process reliable manner overall.

In particular, the cartridge is provided with ribs on its outwardly directed side or has other wall portions, at least one of the flow ducts being formed via said ribs or wall portions. It is thus possible for a series of flat secondary flow ducts located alongside one another to be created, as viewed in the radial direction, in the circumferential direction around for example the hollow body of the cartridge. The wall of the cartridge, against the inner side of which a pig can bear, thus has on its outer side means for forming a flow duct, such that the construction can be formed easily and in a space-saving manner overall.

A functional and at the same time favourable configuration of the cartridge is created when the deflection region is formed by at least one recess in the cartridge and in particular in the wall of the cartridge, wherein the recess is arranged in particular in a half of the cartridge that is directed towards the access point. In this case, the cartridge is subdivided into two halves when viewed in its longitudinal direction. However, it may even be expedient, depending on the pigs used, to arrange the recesses in some other region of the cartridge. All that is relevant is that, in the case of passively operated pigs, the recess is positioned for loading into the pipeline such that a sealing disc (cup), used for forward drive, of a pig located in the cartridge can be pushed by the medium in the direction of the pipeline. For unloading, according to a further configuration of the device, the recess can then be arranged elsewhere, but at the moment at which the sealing discs of the pig reach the recess, the seal between the pig and the cartridge wall is interrupted such that at that moment the pig ultimately loses its forward drive. Accordingly, the recess should be arranged close enough to the access point that when the pig comes to a standstill in the cartridge, it is removed entirely from the pipeline. Unproblematic loading and unloading is generally realized when the recess is present preferably in the final third of the cartridge in the direction of the access point of the device. There may be one or more recesses arranged in the circumferential direction in a wall of the cartridge. The wall for example of the hollow body of the cartridge then separates the flow ducts, which can exhibit flow in different directions.

In particular, the recess is arranged so far from that end of the cartridge that faces towards the access point that, at the moment at which the seal between the sealing disc and the wall of the cartridge is removed by the recess(es) being reached and the pig ultimately stops, the latter is still arranged within the cartridge.

Alternatively or in addition, the deflection region can also be formed by an open end of the cartridge.

According to a further configuration of the invention, in order to move the cartridge, provision may be made of at least one actuating means, preferably in the form of a double-acting hydraulic cylinder. Such an actuating means, in particular configured in an elongate manner, is able to be accommodated in a space-saving manner in the interior of the in particular at least substantially cylindrical device. It may be arranged next to the (secondary) flow ducts, as viewed in the circumferential direction. In this case, the cartridge can have a zero position, from which it is movable on the one hand out of the attachment piece via the one or more actuating means through the access point and on the other hand in the direction of the pipe line. In particular, at least two actuating means that are arranged on opposite sides with regard to a longitudinal centre axis are present, it being possible, by way of said actuating means, for the cartridge to move in the direction of the region through which flow mainly takes place when the device is in a fastening position as an attachment piece on for example a Y or S piece. The actuating means can also be present in elongate indentations of an otherwise hollow-cylindrical body. The cylinders can be provided, via access openings, with a hydraulic medium which can be fed via an external hydraulic pump.

Preferably, a part of the cartridge is provided with a curved end in such a way that the latter nestles into the pipeline and not only can interrupt the flow but also allows a smooth and preferably virtually flush transition in the downstream direction. The curvature which is realized in this case by the mouthpiece of the cartridge and should be present on account of the inclined introduction into the pipeline preferably has a radius of curvature of around 2.5 D (D=diameter of the pipeline), in order to allow proper introduction of the pig.

In order to arrange the device according to the invention not just on a Y piece attached in a straight manner but also on a curved Y piece or an S piece of a pipeline, the cartridge can have a plurality of cartridge pieces which are arranged next to one another in an articulated manner and which are arranged in particular in sealing contact with one another and have a degree of freedom in the plane defined by the branch with the pipeline, in order to be able to follow the curvature of the attachment piece and/or of the curved Y or S piece. Thus, the attachment piece can either also be used in the case of symmetric or asymmetric Y pieces or even be connected to the pipeline or the particular connecting piece in a manner curved itself or via curved adapters. The cartridge pieces which are arranged next to one another in an articulated manner may be for example hollow parts in the form of spherical shells, which are arranged next to one another via articulations provided with a degree of freedom and which can consist of reinforced, flexible polyurethane or of metal.

Both the rigid and the flexible cartridge can be retained in the attachment piece in a centred and easily movable manner via spacers provided in particular with rollers or other sliding means.

A debris separator which is preferably provided with a closable opening is formed on an underside of the device, in order, when a pig is unloaded, to be able to separate the material entrained by the latter beforehand. This drops under gravity into a depressed region. The debris separator and the recess in the cartridge are in this case arranged with respect to one another such that the recess in the cartridge is at the level of the debris separator with regard to a longitudinal axis of the pipeline, in the state of the cartridge in which it has been moved into the pipeline (use position). Any material can thus drop into the debris separator from the region in front of the sealing disc(s) when the pig stops.

The object set out at the beginning is likewise achieved by an arrangement for loading and unloading a pig into or out of a pipeline which has an in particular Y-shaped or S-shaped pipeline section that forms a branch and forms or can form a portion of a pipeline together with a cavity, wherein a device as described above or below having an attachment piece is included. At the same time, on account of the device, described above or below, according to the invention, in particular on account of the attachment piece, the device is connected or intended to be connected to the pipeline section, with a further fluid-conducting connection to the pipeline or the pipeline section being dispensed with. On account of the configuration according to the invention, it is possible to dispense with the further connection, i.e. the "kicker line". The integrity of the pipeline is thus improved. This device is in particular releasably secured to the pipeline section via a flange. To this extent, that part of the arrangement that is formed substantially by the attachment piece and is in the form of the device according to the invention as described above and below can be separated from the part that is connectable fixedly to the pipeline.

For separation, the interior space of the attachment piece is separable via a valve from the cavity of that part of the arrangement that is able to be integrated into the pipeline via two end regions. A valve known from the prior art is realizable either by a separate attachment piece or in a manner integrated into the Y piece.

Preferably, the cavity of the arrangement, said cavity being located directly between the two pipeline segments that are connected or are to be connected, has a widened region which reduces to an inside diameter of the pipeline in the region of an adapter for the cartridge. This creates an abutment region for the end piece of the cartridge, the inside diameter of which should correspond to an inside diameter of the pipeline, in order to receive a correspondingly adapted pig and to be able to introduce it into the pipeline. As a result of the volume of the cartridge and in particular the configuration of flow ducts on the outwardly directed surface thereof or the outer shape thereof, the arrangement has a somewhat larger diameter than the pipeline region into which this device is integrated. At the same time, a good sealing region for the abutment of a mouthpiece of the cartridge can be created in this way, in order to form both an interruption in the flow and good abutment in order to introduce the pig.

In the direction of that end of the enlarged cavity of the arrangement according to the invention that is remote from the adapter, the inside diameter of the interior space narrows preferably via a tapering part that has little negative impact on the flow resistance, in particular a conically tapering part.

In order, particularly in movable cartridges, to prevent excessive movement of individual parts which are arranged next to one another in an articulated manner but are nevertheless sealing parts, and thus to continue to ensure sealing of the flow ducts formed thereby with respect to one another, a guide element for the cartridge or the pig is preferably arranged in the cavity. This can be for example a kind of grid or merely an individual rib which has only little negative impact on the flow in the main region of the arrangement between the pipeline segments.

A particularly simple method for inserting a pig into a pipeline, as per the above-described device and depending on whether the attachment piece is already fastened to the Y or S piece or the like, is as follows: In a variant not fastened to the Y piece or other branch, the attachment piece can have an open side on the cartridge mouthpiece side. By being driven by the actuating means via for example separate hydraulic motors, the cartridge can be extended via this open side. On the opposite side, the pig can then be introduced into the attachment piece by means of a separate carriage. Once the carriage has been removed and the access point closed, the pig can be received in the cartridge by way of the latter being moved back into the starting position. For this purpose, that end of the cartridge that is located accordingly at the access point can be provided with a narrowing inlet region for the purpose of improved introduction of the pig. Alternatively, for example with the attachment piece in a position already fastened to the Y piece, the pig can be pushed into the cartridge via for example a forklift truck.

Once the attachment piece has been provided with the pig, a valve can be opened in the connecting region between the attachment piece and the Y piece, and so the cartridge can be moved into the use position. In this use position, a medium flow located in the pipeline is deflected by the flow ducts which are formed by the cartridge, as a result of the cartridge or the mouthpiece thereof being in sealing or virtually sealing contact with a corresponding region or adapter region in the cavity of the Y or S piece. Flow against the pig thus takes place from behind and the pig is pushed into the pipeline. Once the pig has been pushed into the pipeline, this being able to be monitored for example by corresponding markers, the cartridge can travel back into its starting position. In order to receive the pig on unloading out of the pipeline, an accordingly reversed procedure is then carried out.

Alternatively, in order to be introduced into a pipeline, a pig can also be provided with active drive means in addition to the sealing discs or cups. In this respect, the pig is an actively and passively movable pig, as is described in DE 10 2013 106 424 A1, the disclosure content of which is hereby made the subject of this application, too. After a valve between the attachment piece and Y or S piece has been opened, the pig can be moved in the direction of the main flow of the pipeline via active drive means. At the time at which the pig, which is guided in the correct direction in the cavity via appropriate guide means, reaches a particular speed on account of its passive drive means, the active drive means can be retracted. It is only when the pig has to be removed from the pipeline again at the end of its inspection or cleaning travel that continued movement can be carried out via the active drive means when a particular speed is dropped below. This also goes for unloading out of the pipeline, when driving is no longer ensured in a passive manner on account of insufficient contact of the cups against the wall.

Active and passive drive means are preferably integrated into different, in particular directly successive pig segments. For better curve mobility, the pig can be provided, between its active and its passive drive part, with a coupling part that is extendable under tension, such that the two drive parts are further apart in the pipeline in the passive drive mode.

BRIEF DESCRIPTION OF THE DRAWINGS

Further advantages and details of the invention can be gathered from the following description of the figures.

In the figures.

DETAILED DESCRIPTION

Figure 1:
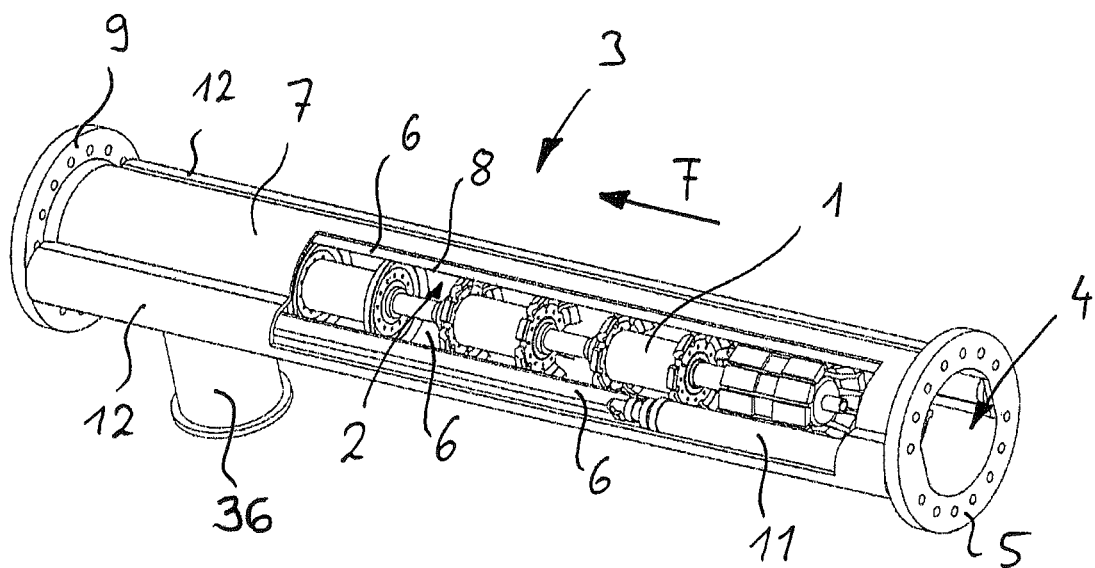
FIG. 1 shows a subject according to the invention.

Individual technical features of the following exemplary embodiments can also be combined with previously described exemplary embodiments and the features of the independent claims and any further claims to form subjects according to the invention. Where appropriate, elements that have the same functional effect are provided with identical reference numerals.

A device according to the invention for loading and unloading a pig 1 into and out of a pipeline (not illustrated in more detail) comprises an attachment piece 3 that has an interior space 2, having an end-side access point 4, which can be closed by way of a cover that is fastenable via a flange 5. Via the access point 4, the pig 1 can be pushed into the interior space 2 and here into a cartridge 6, which is discernible in the cutaway region of the wall 7 according to FIG. 1. The cartridge itself is also cut away in parts and along a cutting edge 8 in the cutaway region for the purpose of viewing the pig located therein. Provided at an end provided with a flange 9 is an outlet, which can lead in the direction of a pipeline or of a cavity in a Y or S piece or similar branch from a pipeline.

Although any actuating means 11 for moving the guide element configured as a cartridge 6 in the longitudinal direction F and counter thereto extend in the present exemplary embodiment in attachments 12 on the wall 7, these can also be arranged directly within a device that is hollow-cylindrical but is then provided with a larger cross section. In the present case, ribs 16 serve for supporting the cartridge 6 on the inner side of the wall 7.

Figure 2:
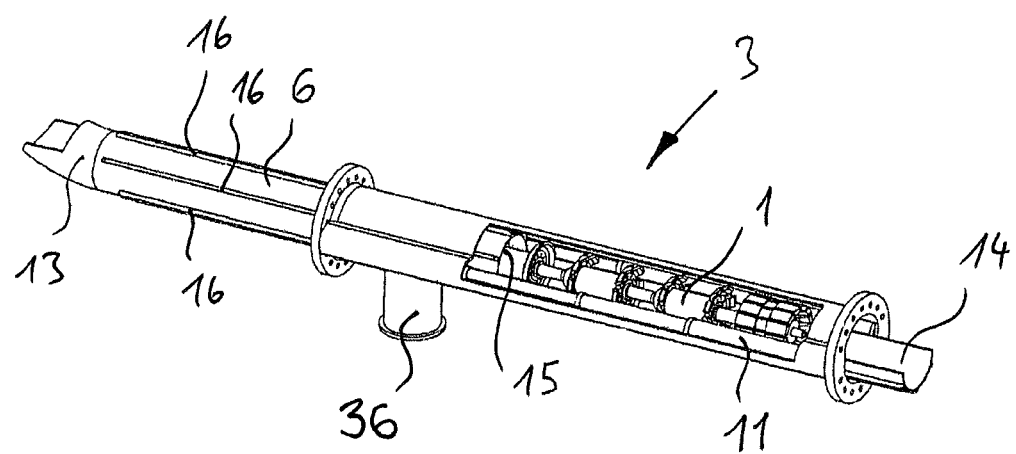
FIG. 2 shows the subject according to FIG. 1 in an operating position for introducing a pig.

FIG. 2 illustrates the cartridge 6 in an extended state, as can be the case for example when the cartridge is loaded with a pig 1. The actuators 11 have been extended. The cartridge 6 has a hollow body with a mouthpiece 13 which, as can be seen, encloses the pig in the circumferential direction, i.e. about its longitudinal axis, which extends parallel to the direction of movement F. The mouthpiece 13 of the cartridge 6 is configured as a closing part which comes into abutment against the wall of a Y or S piece or similar branch in the pipeline.

In FIG. 2, the pig has been pushed into the interior space 2 of the attachment piece 3 via a carriage 14. Once the carriage 14 has been removed from the housing and the access point 4 has been closed, the cartridge 6 is pushed over the pig 1 by means of the actuating means 11. The main part of the cartridge 6 is formed in a substantially cylindrical manner, as is illustrated in FIG. 2 via the circular edge 15.

Formed on its outwardly directed side or surface of the wall 6 are ribs 16 which form (secondary) flow ducts. These are arranged alongside one another in the circumferential direction and enclose or bound a (main) flow duct which is formed by the interior space of the hollow cylinder (or body) and in which the medium flows or can flow in the opposite direction. Deflection regions in the form of recesses 17 are illustrated in more detail in FIG. 4. As a result of the deflection regions, the central main duct and the outer ducts are in fluid communication and are connected together in terms of flow in operation during loading or unloading.

Figure 3:
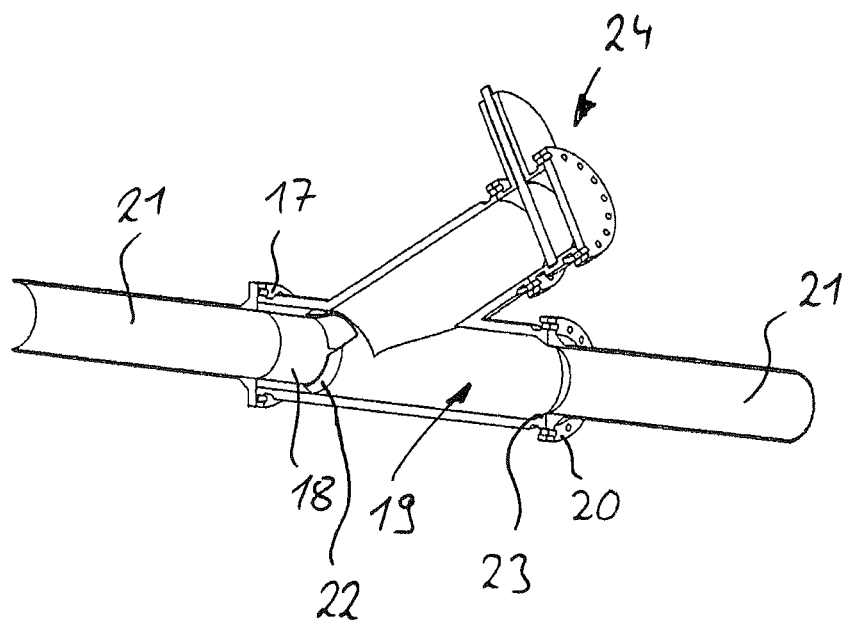
FIG. 3 shows a part of a further arrangement according to the invention.
Figure 4:
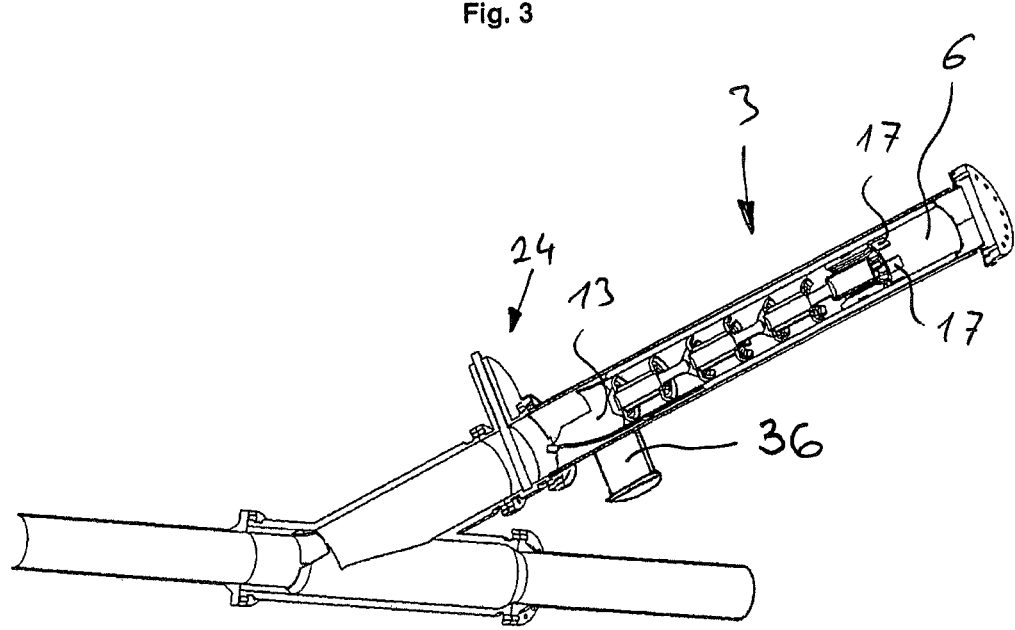
FIG. 4 shows the arrangement according to the invention according to FIG. 3 with an attachment piece.

While the device according to FIGS. 1 and 2 can be operated separately in different branches of a pipeline, FIGS. 3 and 4 disclose a further subject according to the invention, specifically an arrangement comprising an attachment piece 3 according to FIGS. 1 and 2 and a pipeline branch in the form of a Y piece, which is able to be integrated into said pipeline via corresponding pipeline flanges 17. Discernible in the cutaway illustration in FIG. 3 is an adapter 18, via which a cavity 19 having a widened inside diameter is transferred into a diameter corresponding to the further pipeline 21. The adapter 18 has a sealing edge 22 against which the mouthpiece 13 of an attachment piece (not illustrated in FIG. 3) is placeable in a sealing manner. In the region of the right-hand flange 20 in FIG. 3, a transition into the further pipeline 21 located upstream is realized via a conically tapering wall 23. A valve 24 serves for sealing the Y piece, wherein this valve can also be embodied in a manner integrated into the Y piece rather than in a manner releasable therefrom, as illustrated.

Figure 5:
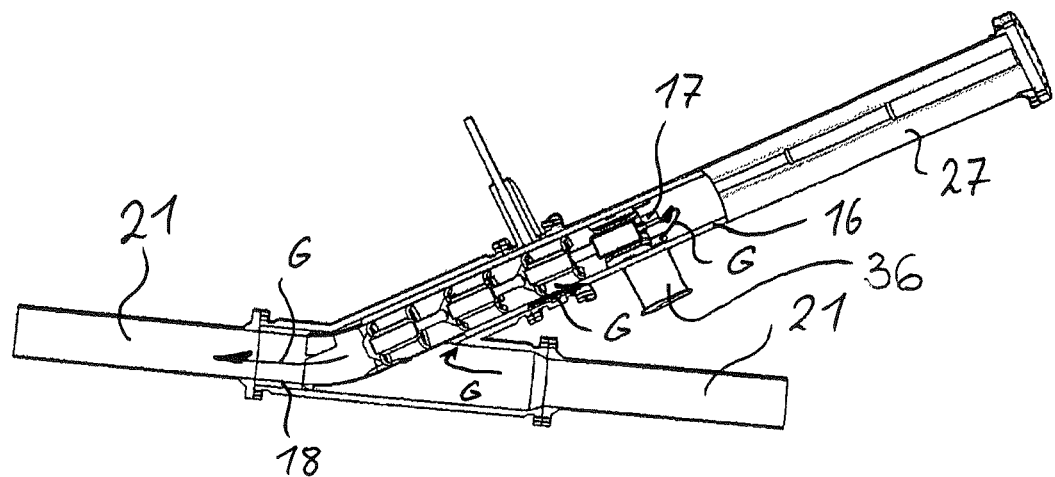
FIG. 5 shows the subject according to FIG. 3 in a further operating position.

FIG. 4 shows the arrangement including the attachment piece 3 with a pig that does not belong to the invention. The cartridge 6 is located with its mouthpiece 13 still above the valve 24 and can be transferred from this position into the sealing contact position shown in FIG. 5. In this position, the mouthpiece 13 forms the cartridge 6 the closure part, which deflects the flow in the pipeline 21 as per the arrows G by way of sealing contact with the adapter 18. In particular the upper right-hand arrow G in the figure indicates the flow through the recesses 17 into the central flow duct, by way of which the upstream and downstream parts of the pipeline are connected together in terms of flow. The height of the ribs 16 and thus the diameter of the attachment piece 3 are dimensioned in this case such that the flow is blocked as little as possible. The cavity 19 should also be dimensioned in a corresponding manner. By way of the flow G, the pig is then loaded into the downstream pipeline 21. A kicker line can be dispensed with. The pipeline should not be additionally opened and the process reliability of the loading operation and accordingly also the unloading operation is increased. Any debris driven forward during a cleaning operation can be collected in a separator 36 present on the underside of the attachment piece 3.

Figure 6:
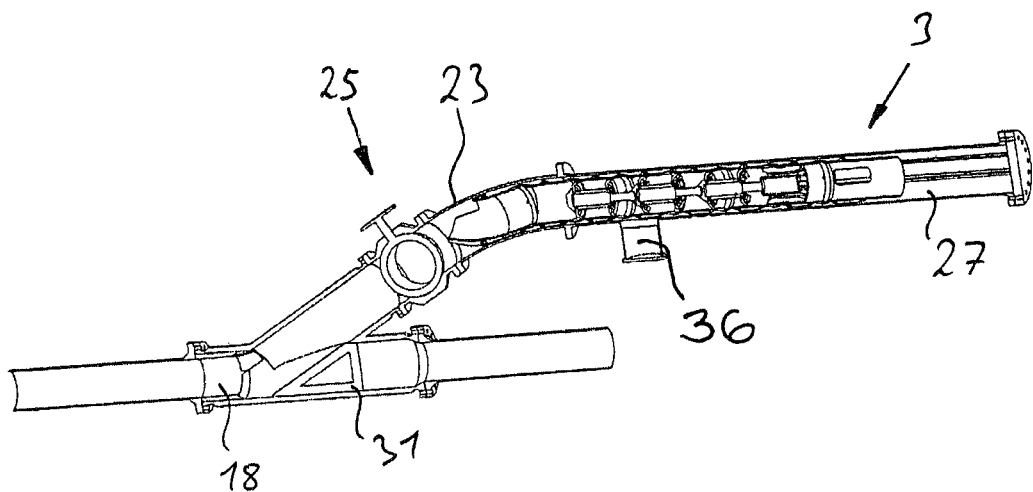
FIG. 6 shows a further subject according to the invention.
Figure 7:
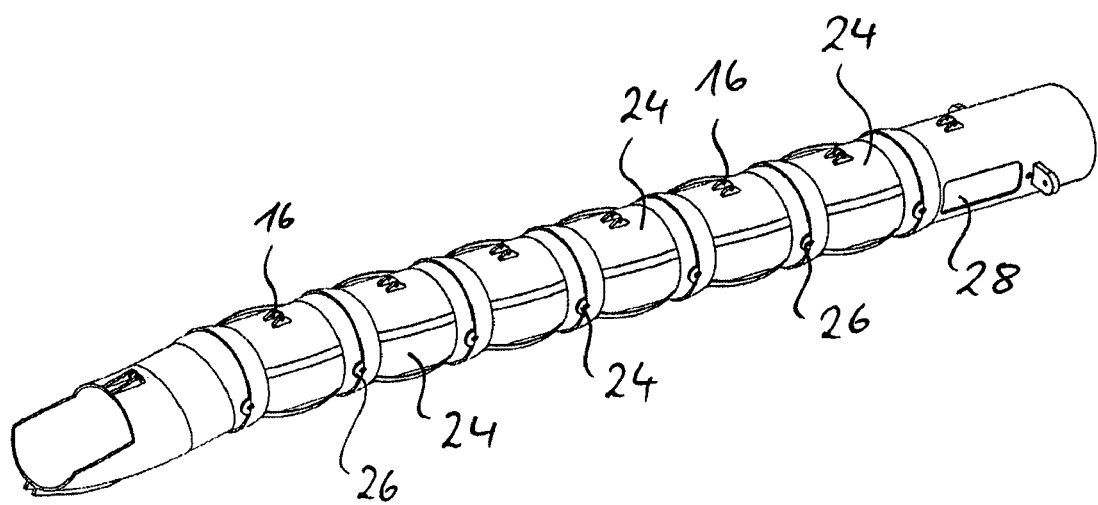
FIG. 7 shows a part of the subject according to FIG. 6, FIGS. 8a and 8b show a further subject according to the invention.

In the further exemplary embodiment illustrated in vertical section according to FIG. 6, the attachment piece is provided with a curved portion 23. This is advantageous for a parallel orientation of the actual attachment piece 3 in a direction parallel to the pipeline. The space requirement is thus minimized. In order to ensure that the cartridge, which is rigid according to the previous exemplary embodiments, is transferred into the abutment position within the Y piece and against the adapter 18, the cartridge is now formed with a series of hollow cartridge pieces 24, illustrated in FIG. 7. These are arranged in sealing contact with one another. The ball joints, which are indicated at the positions 26, allow the relative movement of the cartridge pieces 24 in a plane and are likewise sealed off, such that spacing apart from an inner wall 27 (cf. FIG. 5 and FIG. 6) of the attachment piece 3 takes place via ribs 16 present on the outer side 16. The (secondary) flow ducts are formed as a result. A ball valve serves as shut-off valve. A guide element 31 prevents excessive flapping down of the mouthpiece, which is mounted in an articulated manner on the rest of the cartridge 6.

Recesses 28 represent deflection regions from the main flow duct in the interior of the cartridge and the outer secondary flow ducts.

Figure 8A:
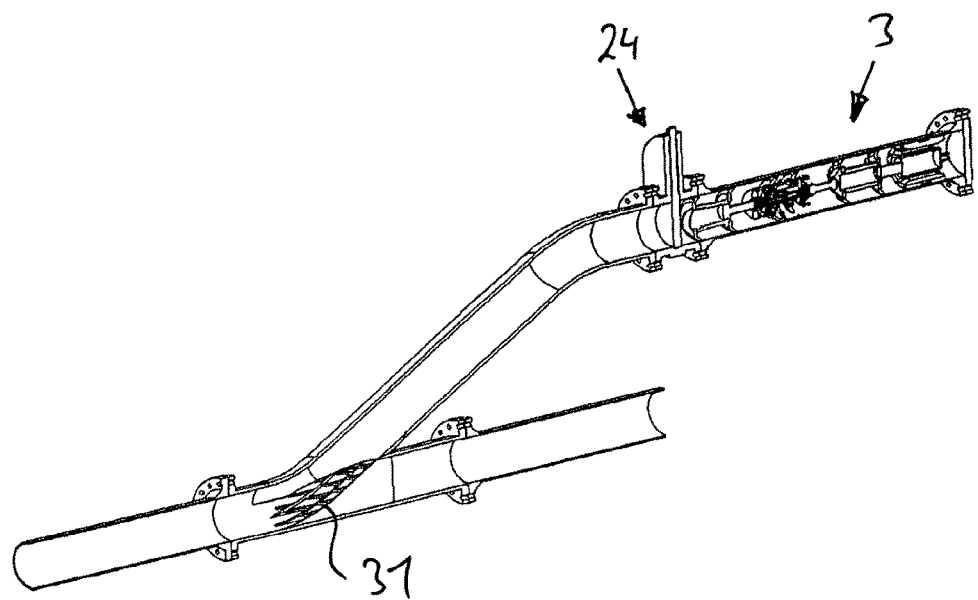
Figure 8B:
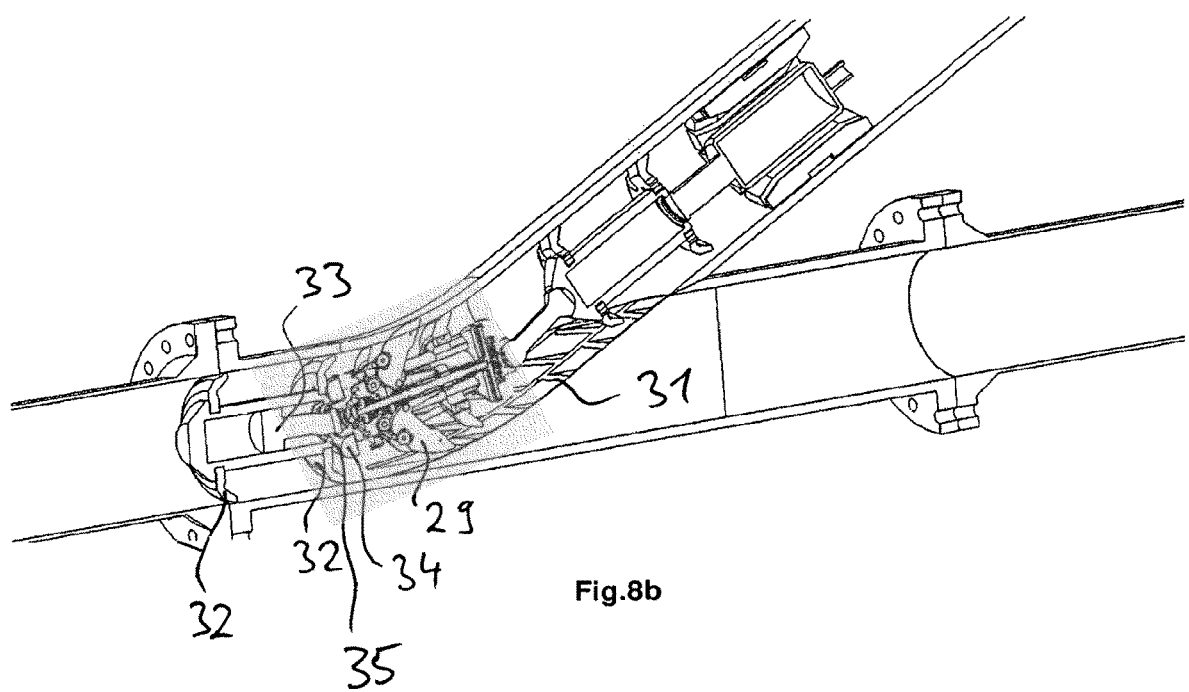

In a further exemplary embodiment of the invention, an alternative attachment for loading and unloading a pig into and out of a pipeline is disclosed. In this case, an attachment piece is provided with an actively and passively drivable pig. When the valve 24 is opened, the pig can travel via active drive means 29 and along a grid-like guide 31 present in the Y or S piece so far into the pipeline or into the main flow duct of the pipeline as to allow forward drive via the sealing discs or cups 32 (cf. FIGS. 8a and 8b). In this case, the active drive means 29 then retract and the pig is moved passively through the line. In the case of unloading out of the pipeline, the pig is then pushed along the guide element 31 in the direction of the attachment piece 3 for as long as passive forward drive takes place. When a particular speed is dropped below, the pig can then be moved back into its starting position in the attachment piece 3 via the active drive means 29.

The active drive means 29 are arranged in an individual segment that is separate from the traction segment arranged at the front. The two segments are connected together via a piston 33. The latter is arranged in a longitudinally movable manner in the traction element and in the state pushed in by the pressure of the active drive means 29 in the position shown in FIG. 8b. For defined abutment of the second pig segment with the active drive means 29 against the first drive element, said pig segment has a preferably annular impact piece 34. If the front traction unit takes over the drive as a result of the prevailing medium pressure, the distance from the second segment increases until the head of the piston bears against a rear-side shoulder 35 and the tool has good curve mobility.

The invention claimed is:

1. A device for loading and unloading a pig into or out of a pipeline, said device comprising:
   an attachment piece having an interior space, with an end-side access point into the interior space and an outlet leading in the direction of or into the pipeline; and
   a guide element in the form of a cartridge having a hollow body for receiving the pig is arranged in the interior space, said cartridge comprising a mouthpiece which surrounds a circumference of the pig, said mouthpiece configured as a closure part, said cartridge being movable in the longitudinal direction (F) of the attachment piece in the interior space,
   a first flow duct defined between the cartridge and an inside surface of the attachment piece, said first flow duct extending in the longitudinal direction of the cartridge, and a second flow duct defined within said hollow body, said first and second flow ducts connected together by at least one deflection region
   wherein said first and second flow ducts are brought into fluid communication with a medium flowing in the pipeline when said cartridge is advanced in the longitudinal direction (F) to position said closure part into a use position projecting from said outlet, said medium flowing in a first direction away from said mouthpiece in said first flow duct and flowing in a second direction opposite to said first direction in said second flow duct.

2. The device of claim 1, wherein the cartridge forms a circumferentially closed hollow body when viewed in the longitudinal direction of the guide element.

3. The device of claim 2, wherein the cartridge forms a central receiving region in which the pig can be arranged close to an inner wall of the hollow body.

4. The device of claim 1, wherein the first and second flow ducts are located alongside one another transversely to the longitudinal axis of the attachment piece.

5. The device of claim 1, wherein the cartridge has ribs or wall portions on its outwardly directed side, at least one of the flow ducts being formed via said ribs or wall portions.

6. The device of claim 1, wherein the deflection region is formed by at least one recess in the cartridge, which is arranged in particular in a half of the cartridge that is directed towards the access point.

7. The device of claim 1, comprising at least one actuating means in the form of a hydraulic cylinder, said actuating means arranged to move the cartridge in the longitudinal direction.

8. The device of claim 1, wherein the cartridge comprises a plurality of cartridge pieces which are arranged next to one another in an articulated manner.

9. The device of claim 1, comprising a debris separator formed on an underside of said attachment piece, said debris separator having an opening for removal of the debris.

10. An arrangement for loading and unloading a pig into or out of a pipeline having a Y-shaped or S-shaped pipeline section that forms a branch and can form a portion of a pipeline together with a cavity, said arrangement comprising a device of claim 1, wherein the device is connectable to the pipeline section, without a fluid-conducting connection to the pipeline or the pipeline section other than the outlet of said attachment piece.

11. The arrangement of claim 10, wherein the device is releasably secured to the pipeline section via a flange.

12. The arrangement of claim 10, wherein said Y-shaped or S-shaped pipeline section includes two end regions by which the Y-shaped or S-shaped pipeline section can be integrated into the pipeline, and the interior space of the attachment piece is separable via a valve from the cavity.

13. The arrangement of claim 12, wherein the cavity has a widened region which reduces to an inside diameter of the pipeline in the region of an adapter for the cartridge.

14. The arrangement of claim 10, comprising a second guide element for the cartridge or the pig, is arranged in the cavity.

\* \* \* \* \*